United States Patent [19]

Gazonnet

[11] 4,331,776
[45] May 25, 1982

[54] POLYAMIDE MASTERBATCHES

[75] Inventor: Jean-Pierre Gazonnet, Saint Didier, France

[73] Assignee: Rhone-Poulenc Industries, Paris, France

[21] Appl. No.: 265,402

[22] Filed: May 20, 1981

Related U.S. Application Data

[63] Continuation of Ser. No. 79,889, Sep. 28, 1979, abandoned.

[30] Foreign Application Priority Data

Oct. 5, 1978 [FR] France .................................. 78 28946

[51] Int. Cl.³ .................................................. C08J 9/06
[52] U.S. Cl. .......................................... 521/91; 521/138;
521/182; 521/184; 521/189; 521/919; 525/417; 525/425
[58] Field of Search ............... 521/182, 138, 184, 189, 521/91

[56] References Cited

U.S. PATENT DOCUMENTS

| | | | |
|---|---|---|---|
| 4,097,425 | 1/1978 | Niznik | 521/182 |
| 4,105,601 | 8/1978 | Hunter et al. | 521/182 |
| 4,126,590 | 11/1978 | Illy | 521/182 |
| 4,142,029 | 2/1979 | Illy | 521/182 |
| 4,158,724 | 6/1979 | Illy | 521/182 |
| 4,174,432 | 11/1979 | Niznik | 521/139 |
| 4,183,822 | 1/1980 | Collington et al. | 521/184 |

*Primary Examiner*—Morton Foelak
*Attorney, Agent, or Firm*—Burns, Doane, Swecker & Mathis

[57] ABSTRACT

Masterbatches useful for lightweight polyamide molding or extrusion comprise polyamide, a pore-forming agent and a fusible binder that is compatible with the polyamide. Admixture of the masterbatch and granular polyamide polymer results in a polyamide composition which can be molded or extruded into a product having increased homogeneity and expansion uniformity.

17 Claims, No Drawings

POLYAMIDE MASTERBATCHES

This application is a continuation of application Ser. No. 079,889, filed Sept. 28, 1979, now abandoned.

BACKGROUND OF THE INVENTION

1. Field of the Invention

The present invention relates to a polyamide composition useful in the production of lightweight shaped articles. In another aspect, this invention relates to a polyamide composition which contains a pore-forming agent. This invention also relates to a process for preparing the subject polyamide composition. In yet another aspect, the invention relates to a shaped article made from a modified polyamide, such modification comprising the incorporation therein of a minor amount of a masterbatch polyamide composition containing a conventional pore-forming agent.

2. Description of the Prior Art

The U.S. Pat. No. 4,076,667, assigned to the assignee hereof, discloses granules comprising a polycondensate in powder form, a fusible binder having a melting point of 70°–100° C. and which is compatible with the polycondensate and a dyestuff or compound capable of modifying the polycondensate to be shaped. The problems faced when attempting to modify the structure of a polycondensate, in particular, a polyamide, by adding, specifically, a pore-forming agent, however, have still not been addressed and resolved by the prior art. Problems still arise in terms of the incorporation of the pore-forming agent in a manner which results in uniform distribution and, hence, uniform expansion of the product. Several tecnhiques can be employed, each of which exhibits marked disadvantages.

One technique involves preparing a composition in a slow mixer and then granulating the resulting mixture. In this case, it is necessary to use a pore-forming or blowing agent which has a decomposition point higher than the temperature required for granulating the polycondensate. The choice of a suitable pore-forming agent, therefore, is very restricted.

It is also possible to prepare a simple mixture of powdered pore-forming agent and polycondensate by various known means. The very small amount of pore-forming agent, and also its structure, inevitably lead to a poor distribution of the pore-forming agent which manifests itself in the non-uniformity of the product's structure. This non-uniformity is evident, whether within a simple product shaped article or between or among the different shaped articles resulting from a mass production operation.

SUMMARY OF THE INVENTION

Accordingly, it is a primary object of this invention to provide a method for incorporating a pore-forming or blowing agent into a polycondensate, e.g., a polyamide, in order that the final product exhibits increased homogenity and expansion uniformity.

Another object of this invention is to provide a masterbatch composition which can be mixed with a polyamide to form a mixture useful for molding or extruding.

Another object of this invention is to provide shaped articles fabricated from polyamides which contain a pore-forming agent and which are uniform in structure.

Other objects, features and advantages will become apparent to those skilled in the art upon a study of this disclosure and the appended claims.

It has now surprisingly been found that particularly valuable results are obtained by preparing a masterbatch, preferably in the form of granules, which can be mixed before processing with a polyamide to be molded or extruded. The masterbatch composition comprises polyamide, a pore-forming agent, and a fusible binder which is compatible with the polyamide.

In a specific, preferred embodiment, the masterbatch composition comprises at least 40% by weight of the polyamide to be shaped, i.e., molded or extruded, up to 50% by weight of a pore-forming agent and from 10 to 20% by weight of a fusible binder compatible with the polyamide and having a melting point between 70° to 100° C.

DETAILED DESCRIPTION OF THE INVENTION

More particularly, the present invention relates to all thermoplastic polyamides ("nylons") which can be converted or shaped by molding or extrusion and which are obtained by the polycondensation of diacids and diamines, by the homopolycondensation of aminoacids, or also by the polymerization of lactams, e.g., polyhexamethylene adipamide, polycaprolactam, polyhexamethylene sebacamide, polyundecanamide, polylauryllactam, polyhexamethylene azelamide and polyhexamethylene dodecanediamide. Copolyamides and polyamide mixtures are also suitable for the purposes of this invention. For reasons of homogeneity, the same polyamide is generally used in the preparation of the masterbatch as that used in the overall composition destined to the shaping operation.

The masterbatch can be advantageously utilized in proportions in the range of about 0.05 to about 5% by weight relative to the final composition. This proportion is not critical, however, as this proportion can be exceeded without detracting from the invention.

The pore-forming agents suitable for this invention can be any of the organic compounds commonly used as pore-forming agents which have a decomposition point above 100° C. These compounds are described, inter alia, in *Encyclopedia of Polymer Science and Technology*, Volume 2, pages 535 to 560, published by Interscience Publishers, and hereby expressly incorporated by reference and relied upon.

Any suitable binder can be employed in this invention, however, it is preferred that the fusible binder be a polymeric binder of the polyester type and that the binder have a low melting point, e.g., in the range of 70°–100° C. The binder can also consist of a mixture of a polymeric binder with a wax, for example, stearic acid or saponified esters of montanic acids having from 26 to 32 carbon atoms.

The preferred binder is poly(ethylene glycol) sebacate which leads to good results because it can agglomerate the granules of the masterbatch sufficiently for the masterbatch to be easy to handle without the risk of crumbling, thereby giving rise to dust. Poly(ethylene glycol) sebacate allows for ease of crumbling in an extruder, however, thereby permitting easy homogenization with granules of polyamide.

The polyamide to be mixed with the masterbatch, which is preferably in the form of granules, can contain a certain percentage of glass fibers thereby making it possible to obtain reinforced shaped articles. Proportions ranging up to 50% by weight of the polyamide are suitable. The masterbatch, itself, however, should not contain glass fibers because during the preparation of the masterbatch the glass fibers would be ground to a greater or lesser extent.

It is possible, nonetheless, to incorporate fillers or various other modifiers into the masterbatch. Similarly, the polyamide with which the masterbatch is to be mixed can also contain various modifiers or fillers.

Pigments and adjuvants which are dispersible in the mass to be compression-molded, injection-molded or extruded and preferably used as the modifiers. The modifiers are generally employed in a proportion up to 50% by weight of the total mass. For purposes of the present invention, examples of suitable adjuvants are light stabilizers or heat stabilizers, crystallizing or nucleating agents which improve the uniformity of crystallization of the polyamide employed, matting agents which are optionally surface-treated, fireproofing agents and fillers.

The masterbatch composition according to the present invention, preferably in the form of granules or pellets, is conveniently formulated via, for example, the following process:

The polyamide or polyamides to be shaped, which serve as a support for the masterbatch granules, are themselves granulated into of a more or less fine powder by any known process. The particle size is typically between 50 and 400 microns. The polyamide or mixture of polyamides, the fusible binder and the pore-forming agent, and also, if appropriate, other adjuvants such as fillers, are mixed for a sufficient period of time and at a sufficient temperature so that the temperature of the mass at the end of the operation is above the melting point of the binder. It is preferred that the components are dry mixed and densified in a turbo-mixer for a time period of about 2 to about 15 minutes, which characteristically brings the temperature of the mass at the end of the operation to above the melting point of the binder. The process can be carried out at ambient temperature with the heating due to the stirring and the friction of the powders being sufficient to raise the temperature of the mass by autogeneous heating, or, the process can be carried out hot, for example, at the melting point of the fusible binder, thereby allowing the binder to liquify and coat the mixture. The duration of the mixing depends on the heat conditions and can vary over wide limits. Generally, from 2 to 3 minutes is sufficient if the process is carried out hot and up to about 15 minutes if the temperature increase is produced by the heat generated during the formulation procedure.

This densification operation makes it possible to impart a certain cohesion to the powders introduced by virtue of the presence of the fusible agent. The fusible binder can be used in a proportion of 10 to about 20% by weight relative to the whole of the masterbatch; 20% by weight can be exceeded but a complete agglomeration of the mixture is unlikely to take place. Amounts smaller than 10% can also be employed; however, it has been found that the best results are obtained by using from about 10 to about 20% of the binder.

Various types of commercial turbo-mixers can be used, for example, turbo-mixers of the Henschel, Diosna or Papenmeier types.

The resultant densified mixture can then be granulated or pelletized in conventional commercial granulators, for example, in a Hutt (trade-mark) type G granulator.

To granulate the masterbatch, the masterbatch composition should be introduced while hot into a granulator, e.g., at a minimum of 50° C., with the granulation rollers being maintained at a temperature which is equal to or slightly above the melting point of the fusible binder.

The granules can then be left to cool at the outlet of the apparatus until they acquire a sufficient hardness to enable handling without the risk of crumbling.

The densified masterbatch product can also be pelletized hot or cold with any type of commercial pelleting machine. This also affords pellets having a sufficient hardness to be able to be handled without risk of crumbling.

The advantages of the masterbatch according to this invention are significant. The availability of a masterbatch containing a large amount of pore-forming agent in a concentrated, easy to handle form is a desideratum, indeed. The degree of expansion of the desired shaped article is easily adjusted by the amount of masterbatch incorporated into the total amount of polyamide plus masterbatch. This incorporation, which is generally carried out at the inlet of an extruder, results in a shaped product in which the uniformity of the expansion is difficult, if not impossible, to achieve with conventional mixing processes. Furthermore, the fact of having available granules of masterbatch which can easily fuse as soon as same have been introduced into the extruder also makes it possible to increase the homogeneity of the product to be molded or extruded.

In order to further illustrate the present invention and the advantages thereof, the following specific examples are given, it being understood that same are intended only as illustrative and in nowise limitative.

EXAMPLE I 1,500 g of polyhexamethylene adipamide powder having a mean particle size of 300 microns, 1,500 g of a pore-forming agent which decomposes at 230°–260° C. and comprises the isopropyl ester of azodicarboxylic acid (trade-mark GELOGEN HT 550) and 450 g of poly-(ethylene glycol) sebacate, having a melting point of about 73° C., were introduced into a rapid mixer, trademark HENSCHEL, having a capacity of 6 liters.

After rotating for 5 minutes at 3,000 rpm, the temperature of the powder rose to 75°–80° C. A densified powder was obtained which, while still hot, was granulated in a HUTT type G gear-type granulator. This afforded granules having a diameter of about 3 mm and a length of 3 to 5 mm.

The resulting granules had very good cohesion and a sufficient hardness to be utilized as charge to an extruder or an injection-molding machine in a mixture with other, preferably polyhexamethylene diamine, granules.

EXAMPLE II

The procedure of Example I was repeated, but substituting: 1,500 of powdered polyhexamethylene diamine, 750 g of the same pore-forming agent, 750 g of calcium carbonate and 450 g of the same poly(ethylene glycol)-sebacate. Equivalent results were obtained from the point of view of both the operative procedure and the physical properties of the resultant granules.

EXAMPLE III

A direct mixture of powder was prepared, not following the procedure of this invention, of a composition containing: 0.5% of the pore-forming agent indicated above, 69.695% of polyhexamethylene adipamide, 29.655% of glass fiber and 0.15% of poly(ethylene glycol)sebacate. This mixture of powder, which had been well homogenized in a slow mixer, was introduced into the hopper of a single-screw transfer extruder having a screw diameter of 60 mm, a length of 120 cm and a transfer capacity of 4,000 cm³.

The various heating zones of the extruder were set at the following temperatures: 230° C., 260° C., 280° C., 280° C., 270° C., 270° C. and 280° C. The clamping force of the mold, which mold consisted of 2 cavities, namely an upper cavity and a lower cavity, was 70 tons and the cooling time was 5 minutes. This gave moldings having a degree of expansion of about 30%. The moldings from the first eight molding operations were weighted. The following results were obtained:

TABLE I

| No. of Operation (Weight in Grams) | 1 | 2 | 3 | 4 | 5 | 6 | 7 | 8 | Mean |
|---|---|---|---|---|---|---|---|---|---|
| Molding 1 | 1,421 | 1,405 | 1,402 | 1,402 | 1,423 | 1,431 | 1,433 | 1,429 | 1,418 |
| Molding 2 | 1,320 | 1,327 | 1,330 | 1,335 | 1,348 | 1,340 | 1,366 | 1,361 | 1,341 |
| TOTAL: 1 + 2 | 2,741 | 2,732 | 2,732 | 2,737 | 2,771 | 2,771 | 2,799 | 2,790 | 2,759 |

It was found that for each series of moldings there was a maximum deviation of 31 g, i.e., 2.2%, for molding 1, of 46 g, i.e., 3.4%, for molding 2, and of 67 g, i.e., 2.4%, for the sum of the 2 moldings corresponding to one injection-molding operation; also, there was a tendency for the weight of the moldings to increase in accordance with the order in which they were injection-molded, the lightest moldings being obtained at the beginning of the injection molding operation. This tendency could result due to a phenomenon involving separation of the powders with the finer powder i.e., the pore-forming agent, tending to decant and separate out from the homogenized mixture.

EXAMPLE IV

A masterbatch was prepared as indicated in Example I, with 1.15% by weight of this masterbatch being mixed with 99.85% by weight of polyhexamethylene diamine granules which contained 30% by weight of fiber as a filler. The final composition was, therefore, the same as that in Example 3.

Moldings were prepared as indicated in Example 3 and the moldings from the first eight molding operations were weighed; the following results were obtained:

TABLE II

| No. of Operation (Weight in Grams) | 1 | 2 | 3 | 4 | 5 | 6 | 7 | 8 | Mean |
|---|---|---|---|---|---|---|---|---|---|
| Molding 1 | 1,400 | 1,380 | 1,385 | 1,392 | 1,401 | 1,387 | 1,402 | 1,390 | 1,392 |
| Molding 2 | 1,290 | 1,300 | 1,300 | 1,292 | 1,288 | 1,295 | 1,287 | 1,293 | 1,293 |
| TOTAL: 1 + 2 | 2,690 | 2,680 | 2,685 | 2,684 | 2,689 | 2,682 | 2,689 | 2,683 | 2,685 |

It was found that for each series of moldings there was a maximum deviation of 22 g, i.e., 1.56% for molding 1; of 13 g, i.e., 1%, for molding 2; and of 10 g, i.e., 0.37% for the sum of the 2 moldings corresponding to one injection-molding operation; also, there was an absence of drift in either direction in the weight from each injection-molding operation. Thus, a greatly improved uniformity (about 6 times better) was obtained as compared with the conventional technique described in Example 3, i.e., 0.37% instead of 2.4% deviation.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A masterbatch composition of matter comprising a plurality of granules of (i) a particulate polyamide intimately admixed with (ii) a pore-forming agent therefor, said particulate polyamide and said pore-forming agent admixture being coated with and agglomerated by (iii) a fused binder material which is compatible with said polyamide (ii).

2. The composition of matter as defined in claim 1, comprising at least 40% by weight of the polyamide (i), up to 50% by weight of the pore-forming agent (ii), and from about 10 to 20% by weight of the binder (iii), said binder (iii) having a melting point of from about 70° to 100° C.

3. The composition of matter as defined by claim 1, said polyamide (i) being selected from the group consisting of polyhexamethylene adipamide, polycaprolactam, polyhexamethylene sebacamide, polyundecanamide, polylauryllactam, polyhexamethylene azelamide and polyhexamethylene dodecanediamide.

4. The composition of matter as defined in claim 3, wherein the binder (iii) is a polyester.

5. The molding powder comprising a granular polyamide resin in intimate admixture with the composition of matter as defined by claim 1.

6. The molding powder as defined by claim 5, comprising from about 0.05 to 5% by weight of said composition of matter.

7. The molding powder as defined in claim 6, comprising a reinforcing amount of glass fibers.

8. The composition of matter as defined by claim 4, wherein the fusible binder is poly(ethylene glycol)sebacate.

9. The molding powder as defined by claim 6, further comprising a member selected from the group consisting of a pigment and an adjuvant.

10. The molding powder as defined by claim 5, the granular polyamide resin and the polyamide (i) being the same polymer.

11. The molding powder as defined by claim 10, the polyamide being polyhexamethylene adipamide.

12. A process for the formulation of the composition of matter as defined by claim 1, comprising intimately dry admixing the components (i), (ii), and (iii) under conditions such that the temperature of the admixture exceeds the melting point of the binder (iii) and subsequently granulating the admixture.

13. The process as defined by claim 12, further comprising pelletizing said granules.

14. The composition of matter as defined by claim 2, in a pellet form.

15. A shaped article comprising the composition of matter as defined by claim 1.

16. A shaped article comprising the molding powder as defined by claims 5, 6 or 7.

17. A process for molding a shaped article wherein the masterbatch composition of matter of claim 1 is intimately admixed with granular polyamide resin so that said masterbatch comprises from about 0.05 to about 5% by weight of the total resulting composition, and then molding said composition into said shaped article.

* * * * *